Figure 4:
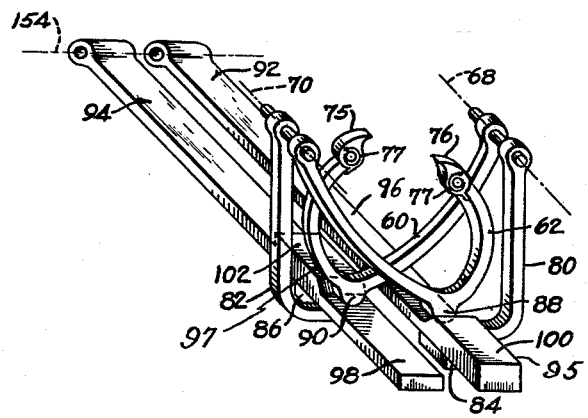

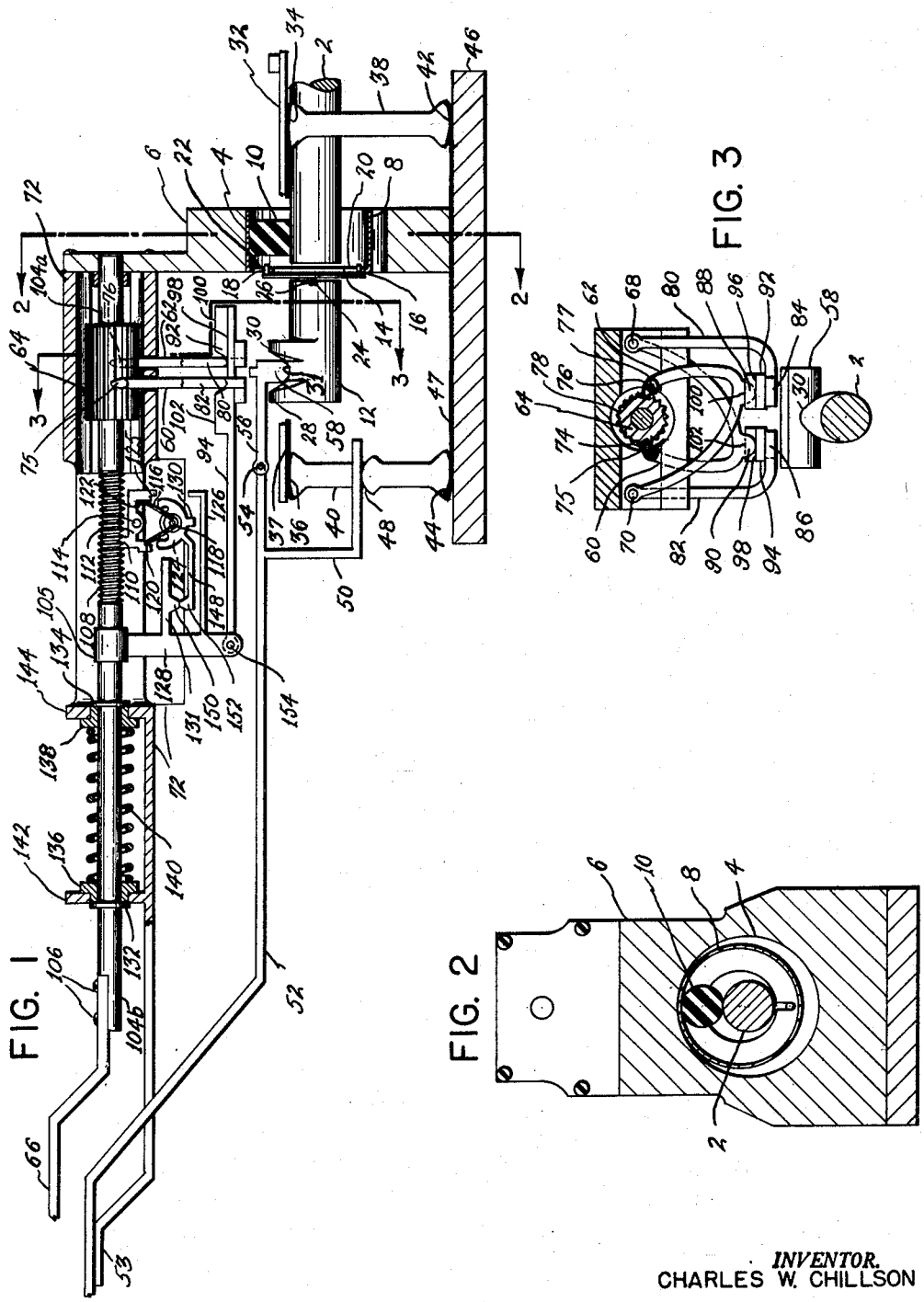

Nov. 19, 1963  C. W. CHILLSON  3,111,263
MECHANICAL INTEGRATING DEVICE
Filed July 1, 1959  2 Sheets-Sheet 2

INVENTOR.
CHARLES W. CHILLSON
BY
*William V. Ebs*
HIS ATTORNEY

United States Patent Office 3,111,263
Patented Nov. 19, 1963

3,111,263
MECHANICAL INTEGRATING DEVICE
Charles W. Chillson, Packanack Lake, N.J., assignor to Curtiss-Wright Corporation, a corporation of Delaware
Filed July 1, 1959, Ser. No. 824,390
4 Claims. (Cl. 235—61)

My invention relates to a mechanical integrating device. It has particular application in the propeller speed control and phase synchronizing system disclosed in the copending application of Charles W. Chillson, Serial No. 644,315, filed March 6, 1957, now Patent No. 3,048,743, but is not necessarily restricted to use in such system.

Basically, the device of the invention is an integrator which, in addition to providing a modified integrated output signal, is adapted to also provide an output signal which is directly proportional to an input signal. As such the device has general application in control systems requiring an integral and proportional type of control.

In a control system for the propellers of a multi-engine aircraft such as disclosed in the aforementioned patent application and with each of the propellers including such a device operated in response to signals representing the extent to which the propeller with which the device is associated is out of phase with the other propellers, the device will provide proportional output signals with which phase deviations caused, for example, by transient atmospheric conditions can be corrected and will also provide integrated output signals with which phase deviations resulting from a difference between the set speed of the propeller and the speed of the other propellers can be corrected. The manner in which the device may be connected with each of the propellers is shown, for example, in the patent application of Charles W. Chillson, Serial No. 34,139, filed June 6, 1960.

The device of the invention includes input signal means as well as drive means, the latter for the purpose of operating the integrating portion of the device in response to an input signal. First and second output members are included. The first output member is operated at a rate directly proportional to the rate of movement of the signal input means and the second is caused to assume a position determined by the integral of the input signal with respect to time. The input signal means operates directly only upon the first output member but is effective to move an actuable member into a position wherein it may be actuated by the drive means, and suitable mechanism operable upon actuation of the actuable member moves the second output member in one direction or another according to the direction of operation of the input signal means.

One of the important features of the device is the manner in which the device operates to normally maintain the second output member, which is positionable according to the integral of an input signal, in a neutral position.

Another feature of the invention is that the device prescribes a predetermined range of operation for the second output member.

Still another feature of the invention resides in the interrelation of the proportioning and integrating portions of the device.

Referring to the drawing wherein similar reference characters refer to similar parts, FIG. 1 is a side view partially in section, and somewhat diagrammatic in form showing the device of the invention, FIG. 2 is a sectional view taken on the plane of the line 2—2 of FIG. 1, FIG. 3 is a sectional view taken on the plane of the line 3—3 of FIG. 1, FIG. 4 is an enlarged perspective view of a portion of the device.

In the drawings, reference character 2 denotes a drive shaft which provides the power for operating the integrator of the device. The drive shaft 2 extends within a circular opening 4 in a structural member 6, the axis of the drive shaft 2 and the axis of circular opening 4 coinciding. Located about the drive shaft and within the opening 4 is a cylindrical member 8 of somewhat less diameter than opening 4. This cylindrical member 8 is maintained in contact with the inside surface of the opening 4 by a slightly compressed resilient roller 10 which forcibly contacts both the drive shaft 2 and member 8. The roller 10 may be formed of any suitable resilient material of which rubber is an example.

It is intended that drive shaft 2 be rotated continuously at a constant or substantially constant speed. The rotation of the drive shaft 2 causes the roller 10 to roll around the inside of cylindrical member 8, the cylindrical member 8 as a result of the rolling of roller 10 being caused to roll about the surface of opening 4. Member 8 connects with a shaft 12 by a washer-like piece 14 having projections 16 and 18 on one side which projections register in and are slideable in slots 20 and 22 provided in an end face 23 of the member 8. The other side of the piece 14 includes one or more projections 24 which register in and are slideable in a slot 26 in shaft member 12. The described connection between cylindrical member 8 and shaft member 12 permits the member 8 to move in either of two mutually perpendicular directions relative to the shafts 2 and 12 as member 8 is rolled about the inside of opening 4. By reason of the rolling motion of member 8 a turning torque is imparted to the shaft member 12 through the washer-like piece 14 causing shaft member 12 to rotate at a reduced speed with respect to the drive shaft 2. It will be seen that the shaft 12 includes cams 28 and 30 which are separated by a gap 31. The cams 28 and 30 are rotated constantly in the manner described but become effective only when an input signal is fed to the device.

An input signal actuates a member 32 moving it to the right or left as viewed in FIG. 1 depending upon the direction of the signal. Such member 32 is supported on cylindrical surfaces 34 and 36 on the upper ends of members 38 and 40 respectively which members are of equal length. Cylindrical surfaces 34 and 36 roll on member 32 through a flexible metal strap 37 when the member 32 is actuated, such metal strap being secured as by spot welding to the member 32 and to right and left hand ends of the surfaces 34 and 36 as they appear in FIGURE 1. The lower ends of the members 38 and 40 have cylindrical surfaces 42 and 44 which roll on a base plate 46 through the flexible metal strap 47 secured as by spot welding to the base plate and right and left hand ends of the surfaces 42 and 44 respectively as they appear in FIGURE 1. The purpose of the straps 37 and 47 is to prevent members 38 and 40 from slipping out from between member 32 and base plate 46, and so maintain parts 32, 38, 40 and 46 in assembled relationship. As the members 38 and 40 roll, the straps 37 and 47 wrap or unwrap on each of the cylindrical surfaces 34, 36, 42 and 44 depending upon the direction of rolling as determined by the input signal. Preferably two additional members similar to the members 38 and 40 are provided on the other side of the shaft 2 directly in back of the members 38 and 40 to support a portion of the member 32. As shown the member 40 includes a cylindrical surface 48 at an intermediate location along its length. An extension 50 at one end of an output member 52 is disposed to contact the surface 48. The other end of the output member 52 is slidable on structure 53 parallel to the base plate 46.

As indicated, when an input signal is imparted to the device, moving member 32 to the right or left, members 38 and 40 are caused to roll on plate 46 through the strap 47, the direction of rolling depending upon the direction of the input signal. Extension 50 in frictional engagement with cylindrical surface 48 on the member 40 is moved by the surface 48 either to the right or left imparting a corresponding motion to the output member 52 as member 40 rolls relative to base plate 46. The cylindrical surfaces on the ends of members 38 and 40 have a diameter corresponding to the overall length of these parts and the cylindrical surface 48 has a diameter which is equal to twice the distance between the point at which member 50 and surface 48 contact and the center of member 40 such that the members 32 and 50 move parallel to the base plate 46 in response to an input signal. The rate of movement of the output member 52 is directly proportional to the rate of movement of the input member 32, the rate of movement of the output member for any particular input signal being equal to the rate of movement of the input member multiplied by the ratio of the diameter of cylindrical surface 48 to the diameter of the cylindrical surface 36.

Pivotally connected to the member 52 at 54 is an actuable member 56 which includes a cam follower 58. Such cam follower normally rides in the gap 31 between the cams 28 and 30. However, as noted, an input signal to the device causes output member 52 to be moved to the right or left and because of the connection between member 52 and member 56 a corresponding motion is imparted to the member 56 and follower 58.

The follower 58 functions to actuate a pair of levers 60 and 62. These levers impart rotation to a gear 64 to drive an output member 66 in one direction or another depending upon the input signal to the device. These gear driving levers 60 and 62 are pivotally mounted at 68 and 70 respectively (FIG. 3) in structure 72 affixed to the structural member 6. Pawls 74 and 76 are pivoted on the ends of the members 60 and 62, such pawls being biased by springs 75 and 77 respectively toward the gear 64 into limiting positions. The pawls in their limiting positions engage gear teeth 78 of the gear 64 such that any upward movement of the members 60 or 62 about their pivotal mountings will impart rotation to the gear in one direction or the other. As shown, another pair of levers 80 and 82 are pivotally mounted at 68 and 70 respectively in the structure 72. The extreme ends 84 and 86 of these levers extend below projections 88 and 90 on the members 62 and 60 respectively. Interposed between the extreme end 84 of the member 80 and projection 88 of the member 62 is a pivotal member 92, and interposed between the extreme end 86 of the member 82 and the projection 90 of member 60 is the pivotal member 94. Each of the members 92 and 94 is pivoted at one end at 154. Member 92 includes surface 96 which extends to the one side of an end platform 95 defining elevated surface 100, and member 94 includes surface 98 which extends from the free end of the member to a platform 97 formed at an intermediate location on the member 94 and defining elevated surface 102. In neutral positions of the members 92 and 94, shown in FIG. 1, the projections 88 and 90 on the members 62 and 60 ride upon the surfaces 96 and 98 respectively. If, however, the members 92 and 94 which are jointly translatable move to the left as seen in FIG. 1 from such neutral position the projection 88 is moved up to the elevated surface 100 on the member 92. If the members are moved to the right from their neutral position the projection 90 is moved up to the elevated surface 102 on the member 94. The members 92 and 94 are connected to move translationally with output member 66 and their neutral position defines a corresponding neutral position for the output member.

Assuming an input signal such as to cause the follower 58 to be moved to the left into a position for actuation by cam 28, rotation of shaft member 12 will periodically cause member 82 to be actuated by the follower 58. Member 82 in turn will lift the member 94 which in turn will react against the projection 90 bearing on the surface 98 to raise the member 60 and cause gear 64 to be rotated clockwise as viewed in FIG. 3. If the input signal is in a direction such as to move the follower member to the right a periodic upward motion is imparted by the cam 30 through the follower 58 to the lever 80 which in turn lifts the member 92, whereupon the member 92 acts against the projection 88 resting on surface 96 of member 92 to cause member 62 to rise and rotate the gear 64 in a counterclockwise direction. After each periodic actuation of the gear, whether in a clockwise or counterclockwise direction, the lever 60 or 62, according to which of the cams is effective, falls back to assume an original unactuated position. The pawls 74 and 76 and gear 64 function as a ratchet and the pawls 74 and 76 take up new positions of engagement with the teeth 78 of gear 64 as the cam surface rotates away from the follower.

The gear 64 is fixed on a rotatable and translatable shaft 104a. One end of shaft 104a is journalled in structural member 6 and the other end connects with a non-rotatable but translatable shaft 104b at a collar 105 which is an integral part of the shaft 104b. The connection between the shafts 104a and 104b may be of any conventional type permitting the one shaft to rotate relative to the other but causing them to translate together. As shown, shaft 104b connects with output member 66 at 106. The shaft 104a includes a threaded portion 108 which mates with threads 110 on a partial nut 112, the partial nut 112 being pivotally mounted at 114 in the structure 72. The partial nut 112, although disengageable from the threads 108, is normally in engagement with the threads on the shaft 104a such that the shafts 104a and 104b, gear 64 on shaft 104a and member 66 on shaft 104b are moved to the right or left as the gear 64 and shaft 104a are rotated.

The threads 110 on the partial nut are maintained in engagement with the threads 108 on the shaft by means of a spring 116 fixedly mounted on a pivot 118 secured in structure 72. The spring which is maintained in a contracted condition normally has one arm thereof disposed in a notch 120 in the nut 112 while the other arm is supported against ledge 122. As shown the spring is embraced by a yoke 124 which is pivotally mounted at 118. The spring arm disposed in notch 120 tends to pivot the nut about 114 in a clockwise direction and thereby maintains the threads of the nut in engagement with the threads of shaft 104a for normal operation of the integrator. When, however, the shafts 104a and 104b are, for example, moved to the left beyond a prescribed distance, the end of member 126, which is integral with an arm 128 fixed on the collar 105 of shaft 104b, engages a projection 130 on the yoke 124, causing the yoke to pivot about 118 and dislodge the spring arm normally engaging notch 120 from the notch 120 in the nut. The other spring arm acting against ledge 122 pivots the nut in a counterclockwise direction about 114 until such spring arm lodges in notch 125, the nut being then disengaged from the threads 108 of shaft 104a. If the shafts 104a and 104b are moved more than the prescribed distance to the right, the member 131 integral with the arm 128 engages the yoke 124 to dislodge the spring arm normally engaging notch 120 from the notch and to cause the other spring arm to pivot the nut about pivot shaft 114 in a counterclockwise direction until the spring arm lodges in notch 125 thereby disconnecting the nut from the screw shaft.

The shaft 104b includes a pair of integral flanges 132 and 134 at spaced intervals. Other flange members 136 and 138 slideable on the shaft 104b are maintained in forced contact with the flanges 132 and 134 respectively by means of a spring 140 which extends about the shaft 104b. The flange members 136 and 138 also abut against projections 142 and 144 on the structure 72. Whenever the shaft 104 is moved either to the right or to the left the spring 140 is compressed by means of the flange 136 or 138 respectively. Such compression of the spring 140 serves to restore the shafts 104a and 104b to neutral longitudinal positions corresponding to a neutral position of members 92 and 94 as defined hereinbefore when the nut 112 is disconnected from the screw threads in the manner described. The nut 112 is restored to engagement with the screw threads 108 by the member 131 on the arm 128 and a member 148 on yoke 124. As the shafts 104a and 104b and attached output member 66 resume their neutral positions projections 150 and 152 on the members 131 and 148 respectively are caused to engage such that the yoke 124 and spring 116 are properly positioned to realign the nut in its position of engagement with the threads 108.

Whenever the gear 64 is caused to move in a clockwise direction, the shafts 104a and 104b and, therefore, the members 92 and 94 which are pivotally connected at 154 on arm 128 move to the left. Assuming shafts 104a and 104b and members 92 and 94 are so moved from their neutral position in which the projections 88 and 90 on members 62 and 60 rest upon surfaces 96 and 98 respectively, the projection 90 on the lever 60 continues to ride on the surface 98 of member 94. However, the projection 88 on the member 62 is moved into an elevated position on the raised surface 100 of member 92. Member 60 is the actuating member while the shafts 104a and 104b and output member 66 are moved to the left and the member 62 is of no effect, the cam follower 58 being actuated by the cam 28 at this time rather than by cam 30. The net result of moving the projection 88 of the member 62 onto the elevated surface 100, however, is that when the cam follower 58 is moved to the right after a leftward movement of the shafts 104a and 104b, lever 62 is moved through a greater distance by the cam 30 than it otherwise would be such that the gear 64 is moved in a counterclockwise direction and the shafts 104a and 104b as well as output member 66 are moved to the right at a faster rate than they otherwise would be. Movement of the shafts 104a and 104b and output member 66 to the right from their neutral positions caused by rotation of the gear 64 in a counterclockwise direction moves the projection 90 on lever 60 onto the elevated surface 102 on the member 94 and as a result when shafts 104a and 104b and output member 66 are moved to the left toward the neutral position after a rightward movement, they approach such neutral position at a faster rate than they moved away from it.

As mentioned hereinbefore the device of the invention may be used advantageously in a propeller phase synchronizing system for a multi-engine aircraft, the proportional output signal of the device as represented by the translation of output member 52 being used to correct phase deviations of a propeller resulting from a transient disturbance, and the integrated output signal as represented by the translation of output member 66 being used to correct phase deviations due to an error in the set speed of such propeller. Assuming all propellers of an aircraft having such a synchronizing system are rotating at a constant speed and a transient disturbance due, for example, to some atmospheric condition causes a phase deviation in one of the propellers, the device will respond quickly in response to an input signal at 32 representing such phase deviation to provide a proportional output signal which may be used to adjust the pitch of such propeller and bring it into phase synchronization with the other propellers of the aircraft.

The output member 66 is slow acting in comparison to the output member 52. However, it is responsive to transient phase deviations and could shift an appreciable amount over an extended period of time due to such transient deviations if the output member 66 were not self centering. Such output member 66 is, however, self centering, that is, the device tends to maintain shafts 104a and 104b and the attached output member 66 in heretofore defined neutral positions. As described, shafts 104a and 104b and output member 66 move toward their neutral positions at a greater rate of speed than they move away from such positions in response to an input signal. Although transient disturbances are as likely to produce a phase deviation in one direction as well as another there is always the possibility of more transient phase deviations occurring in one direction over a definite period of time. The provision in the device for moving shafts 104a and 104b and output member 66 toward their neutral positions at a greater rate of speed than away from such positions takes account of this possibility and serves to maintain the output member 66 in its neutral position over an extended period of time. This is an important feature of the invention. Because of the slow acting character of the integrated output signal such signal has no substantial effect in correcting transient phase errors. The integrated output signal, however, is used to correct phase errors due to the propeller having been set to rotate at a speed different from the other propellers of the aircraft.

The proportional signal cannot correct continuously varying phase deviations which must be corrected by bringing the propeller into speed synchronization with the other propellers. The integrating portion of the device however, by integrating the phase error due to the off speed condition can accomplish this over a period of time. As noted hereinbefore shafts 104a and 104b and therefore the output member 66 are translatable only between prescribed limits, these parts being returned to their neutral positions when moved to a limiting location. The purpose of prescribing limits upon the movements of shaft 104a and 104b and output member 66 is to define a definite range as, for example, 50 r.p.m. over which the integrated output signal may be used to correct an error in the set speed of a propeller.

Although only one form of the invention has been shown in the drawing and described herein, it should be understood that various changes and modifications may be made in the inventive structure without departing from the spirit or scope thereof. I aim to cover all proper modifications and variations in the following claims.

What is claimed is:

1. A mechanical integrator comprising fixed structure; an output shaft slidably mounted in the fixed structure; a shaft mounted in the fixed structure for rotation and axial translation having a gear fixed thereon and including a threaded portion; a nut attached to the fixed structure and in engagement with the said threaded shaft portion for causing the threaded shaft to translate when rotated by the gear; a coupling connecting the output shaft and the threaded shaft for imparting only translational movements of the threaded shaft to the output shaft; an arm translatable with said output shaft; a member pivotally mounted on said arm and extending generally parallel to the aforesaid shafts; a shaft under said member with a cam thereon; a lever pivotally mounted in the fixed structure having an end portion aligned with the cam for actuation thereby, said lever extending under and supporting said member; an actuating lever for moving said gear in one direction of rotation also pivotally mounted in the fixed structure and resting on said member; a cam follower to one side of said cam; and means operatively connected with the cam follower for moving the cam follower into a position of alignment with the cam to cause the gear to be moved in said one direction upon rotation of the cam shaft.

2. A mechanical integrator comprising fixed structure; an output shaft slidably mounted in the fixed structure; a shaft mounted in the fixed structure for rotation and axial translation having a gear fixed thereon and including a threaded portion; a nut attached to the fixed structure and in engagement with the said threaded shaft portion for causing the threaded shaft to translate when rotated by the gear; a coupling connecting the output shaft and the threaded shaft for imparting only translational movements of the threaded shaft to the output shaft; an arm translatable with said output shaft; a pair of members pivotally mounted on said arm and extending generally parallel to the aforesaid shafts; a shaft under said members with a pair of axially spaced cams thereon; a pair of levers pivotally mounted in the fixed structure, one such lever having an end portion aligned with one cam for actuation thereby and the other lever having an end portion aligned with the other cam for actuation by such other cam, the one end portion extending under and supporting one of said members and the other end portion extending under and supporting the other of the said members; a pair of gear actuating levers, one for moving the gear in one direction of rotation and the other for moving the gear in the opposite direction, said actuating levers being pivotally mounted in the fixed structure with one resting on one of the pivotally mounted members and the other resting on the other member; a cam follower positioned between the cams; and means operatively connected with the cam follower to dispose the cam follower in a position of alignment with one cam or the other to cause the gear to be moved in said one direction of the other upon rotation of the cam shaft.

3. An integrator as defined in claim 2 wherein one of the pivotally mounted members includes an elevated portion which in a neutral position of the output shaft is adjacent the gear actuating lever resting on the member and extends to one side of the pair of gear actuating levers, and the other pivotally mounted member includes an elevated portion which in said neutral position of the output shaft is adjacent the gear actuating lever resting on such member and extends to the other side of the pair of gear actuating levers.

4. A mechanical integrator comprising fixed structure having a circular opening therein; an output shaft slidably mounted in the fixed structure; a shaft mounted in the fixed structure for rotation and axial translation having a gear fixed thereon and including a threaded portion; a nut attached to the fixed structure and in engagement with the said threaded shaft portion for causing the threaded shaft to translate when rotated by the gear; a coupling connecting the output shaft and the threaded shaft for imparting only translational movements of the threaded shaft to the output shaft; an arm translatable with said output shaft; a member pivotally mounted on said arm and extending generally parallel to the aforesaid shafts; a shaft under said member with a cam thereon; a drive shaft extending within the opening in said fixed structure; a ring; a resilient roller in contact with the drive shaft and said ring to hold the ring against the surface defining said opening and roll said roller therearound upon rotation of the drive shaft; coupling means connecting the ring and cam shaft for rotating the cam shaft; a lever pivotally mounted in the fixed structure having an end portion aligned with the cam for actuation thereby, said lever extending under and supporting said member; an actuating lever for moving said gear in one direction of rotation also pivotally mounted in the fixed structure and resting on said member; a cam follower to one side of said cam; and means operatively connected with the cam follower for moving the cam follower into a position of alignment with the cam to cause the gear to be moved in said one direction upon rotation of the cam shaft.

References Cited in the file of this patent

UNITED STATES PATENTS

| | | |
|---|---|---|
| 367,625 | Haynes | Aug. 2, 1887 |
| 1,112,459 | Lea | Oct. 6, 1914 |
| 1,548,480 | Obermaier | Aug. 4, 1925 |
| 1,896,527 | Houghton | Feb. 7, 1933 |
| 2,145,026 | Huxford | Jan. 24, 1939 |
| 2,398,600 | Saltzman | Apr. 16, 1946 |
| 2,481,039 | Ross | Sept. 6, 1949 |
| 2,511,104 | Eddy | June 13, 1950 |
| 2,730,300 | Savino | Jan. 10, 1956 |
| 2,754,057 | Stahl | July 10, 1956 |
| 2,858,985 | Blaser | Nov. 4, 1958 |
| 2,875,646 | Bucalo | Mar. 3, 1959 |
| 2,896,480 | Michie | July 28, 1959 |
| 2,898,531 | Gray | Aug. 4, 1959 |
| 2,904,251 | Hazard | Sept. 15, 1959 |
| 2,998,291 | Coggeshall et al. | Aug. 29, 1961 |